United States Patent [19]
Inagaki et al.

[11] Patent Number: 5,154,437
[45] Date of Patent: Oct. 13, 1992

[54] VEHICLE STEERING SYSTEM WITH INDEPENDENT STEERING FOR EACH WHEEL

[75] Inventors: Hidemitsu Inagaki; Satoru Tanaka; Satoru Wakuta, all of Anjo, Japan

[73] Assignee: Aisin AW Co., Ltd., Japan

[21] Appl. No.: 369,518

[22] Filed: Jun. 21, 1989

[30] Foreign Application Priority Data

Jul. 1, 1988 [JP] Japan .................. 63-165498

[51] Int. Cl.⁵ ............... B60K 17/358; B62D 3/02; B62D 7/14
[52] U.S. Cl. ...................... 280/91; 180/234; 180/236; 280/96.1; 280/99; 280/100
[58] Field of Search ............ 280/91, 96.1, 99, 100; 180/233, 234, 236, 140, 79.1, 142, 143; 364/424.05

[56] References Cited

U.S. PATENT DOCUMENTS

| | | | |
|---|---|---|---|
| 621,158 | 3/1899 | Sedgwick | 280/91 |
| 1,170,270 | 2/1916 | Johnston | 280/91 |
| 1,255,775 | 2/1918 | Mueller | 280/91 |
| 3,087,564 | 4/1963 | Quayle | 280/91 |
| 3,972,379 | 8/1976 | Norris | 180/234 |
| 4,446,941 | 5/1984 | Laurich-Trost | 180/236 |
| 4,778,024 | 10/1988 | Matsumoto et al. | 280/91 |
| 4,823,899 | 4/1989 | Ron | 280/91 |
| 4,836,319 | 6/1989 | Haseda et al. | 280/91 |

FOREIGN PATENT DOCUMENTS

| | | | |
|---|---|---|---|
| 141968 | 8/1983 | Japan | 280/91 |
| 190056 | 10/1984 | Japan | 280/91 |
| 57376 | 3/1988 | Japan | 180/234 |
| 275484 | 11/1988 | Japan | 180/234 |
| 438973 | 12/1967 | Switzerland | 280/91 |

*Primary Examiner*—Mitchell J. Hill
*Attorney, Agent, or Firm*—Lorusso & Loud

[57] ABSTRACT

In a steering mechanism wherein the turning angle of a steering wheel is transmitted to a wheel via a link mechanism employing a tire rod (3) and a knuckle arm (4), the link mechanism and the wheel (1) are coupled by a multiplying gear (2). Individual drive mechanisms are mounted independently on each wheel, and each wheel is driven independently to enable front-wheel independent drive, rear-wheel independent drive and four-wheel independent drive. Drive of an inner rear wheel is changed over at a steering angle in the vicinity of 90° to effect control of steering. A steering angle multiplied twofold or more can be obtained in simple fashion via the multiplying gear (2) even for a steering angle of about 45° using the conventional link mechanism. In the drive of each wheel, drive of the inner rear wheel is halted in the vicinity of the 90° steering angle, so that locking of the inner front wheel can be avoided. Further, only the inner rear wheel is driven in the reverse direction when a large steering angle is obtained. This makes smooth vehicle travel possible even at large steering angles.

6 Claims, 8 Drawing Sheets

VEHICLE STEERING SYSTEM WITH INDEPENDENT STEERING FOR EACH WHEEL

BACKGROUND OF THE INVENTION

This invention relates to a steering mechanism that enables a vehicle to be make small sharp turns at a large steering angle, the vehicle to which the steering mechanism is applied, and a system for controlling the steering mechanism.

With reference to FIGS. 1 through 4, there are shown tie rods 41, 55, knuckle arms 42, 56, a king pin 43, a tie rod end 44, a steering shaft 51, a suspension arm 52, a pinion 53, a rack 54, a steering housing 57, a worm mechanism 58, a worm 58-1, a sector gear 58-2, a sector shaft 58-3, and a Pitman arm 59.

In order for a four-wheeled vehicle to turn smoothly, it is required that the wheels have the same turning center. To this end, conventional steering mechanisms employ a link mechanism using a knuckle arm, by way of example.

Figure 1:
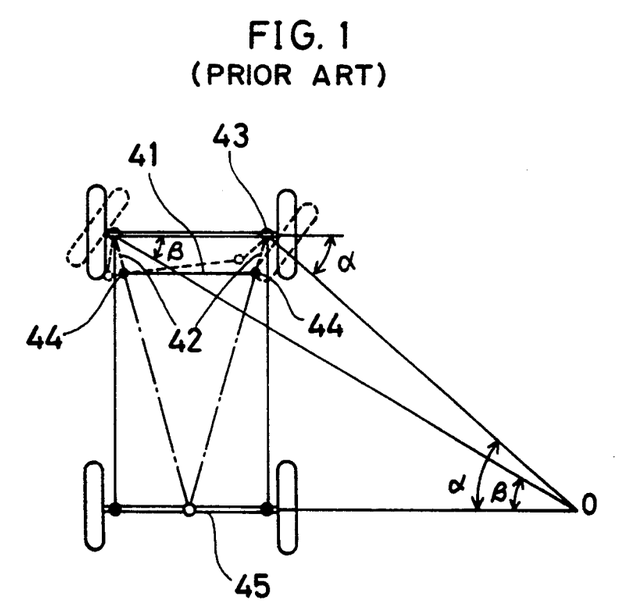
FIG. 1 is a view illustrating the conventional arrangement and principle of a steering mechanism.

As shown in FIG. 1, a conventional steering mechanism has the tie rod 41 connected to one end of the knuckle arm 42 at the tie rod end 44, with the other end of the knuckle arm 42 being secured to the king pin 43 of the corresponding left or right wheel. If the knuckle arms 42 are angled in such a manner that extensions of the knuckle arms 42 of the left and right wheels intersect the center A of a rear axle 45, the turning centers of the wheels will be the same. The turning centers 0 are formed on an extension of the rear wheel axle, as illustrated.

Figure 2:
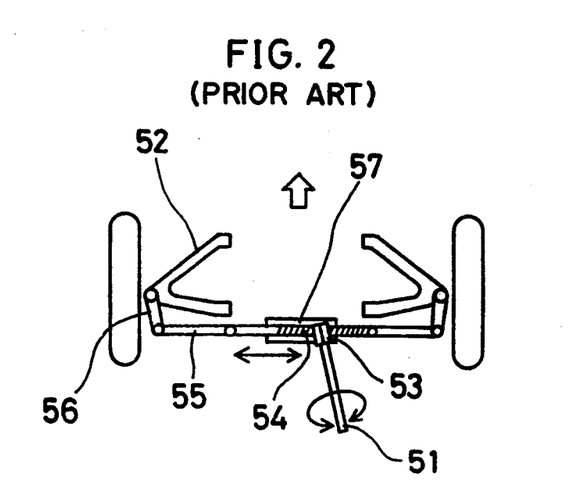
FIG. 2 is a view showing a prior-art example of a vehicle steering mechanism employing a rack-and-pinion arrangement.
Figure 3:
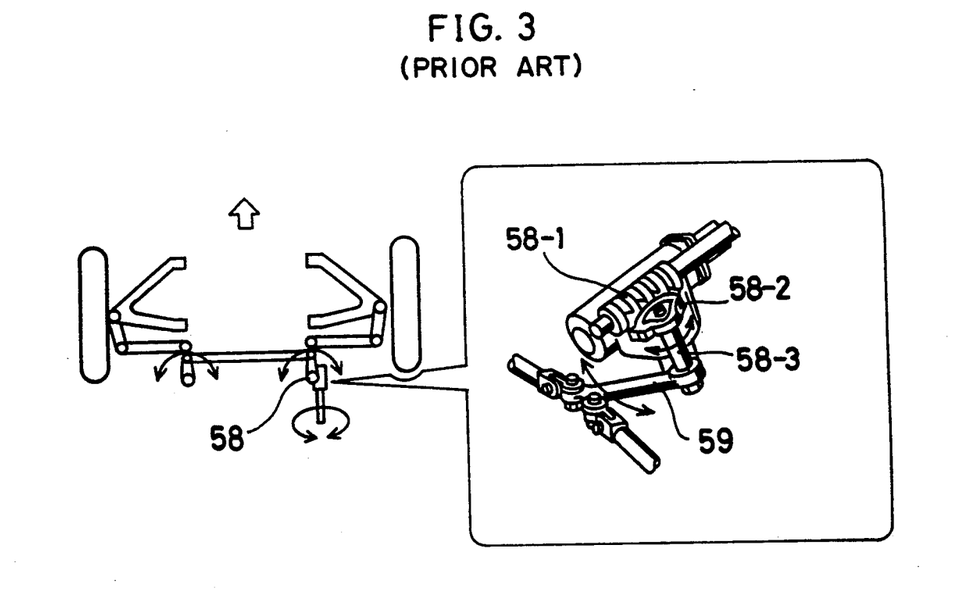
FIG. 3 is a view showing a prior-art example of a vehicle steering mechanism employing a worm arrangement.
Figure 4:
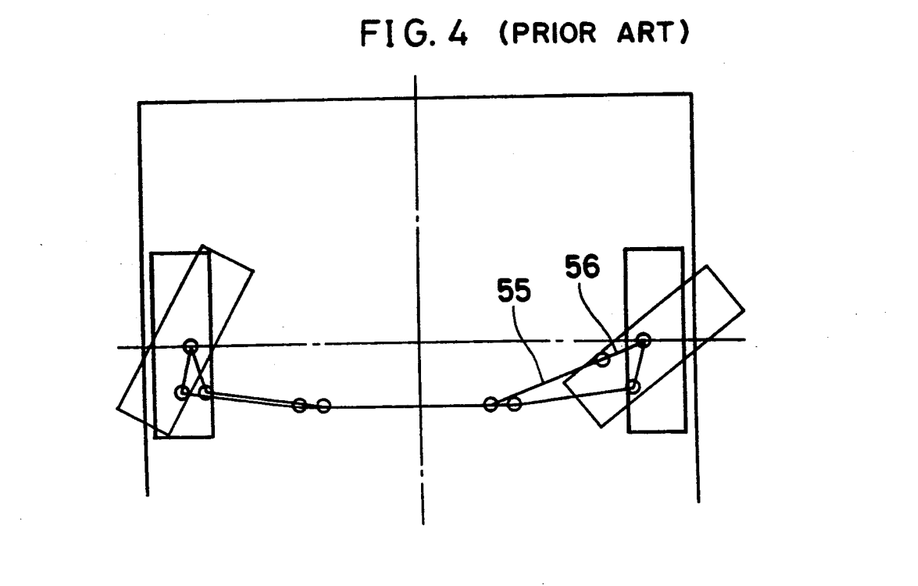
FIG. 4 is a view for describing the limitation on steering angle with the conventional steering mechanism.

In a rack-and-pinion steering mechanism, which is one of the conventional steering mechanisms, the tie rod 55 is oscillated to the left and right by the rack 54 and pinion 53 as the steering shaft 51 is rotated, as shown in FIG. 2, so that a wheel connected to the knuckle arm 56 is turned about the king pin to effect steering. A steering mechanism other than of the rack-and-pinion type employs a worm arrangement shown in FIG. 3. All of the above configurations make use of a link mechanism based on the principle shown in FIG. 1.

With these conventional vehicle steering mechanisms, a state in which the tie rod 55 and knuckle arm 56 fall on the same straight line represents the steering limit angle. This limits the ability of the vehicle to make small sharp turns. The limit angle ordinarily is about 45°.

Even if it were made possible for the steering angle to exceed the conventional limit angle and attain a value of, say, 90°, a rear-wheel drive vehicle would be incapable of traveling with the steering angle set at 90° because the direction in which the driving force is applied would be at right angles to the direction of the wheels. Thus, even if a sufficiently large steering angle could be obtained with the conventional steering mechanism, wheel lock-up might occur with a rear-wheel drive vehicle and make travel impossible.

SUMMARY OF THE INVENTION

An object of the present invention is to obtain a large steering angle.

Another object of the present invention is to enable small sharp turns to be made smoothly without wheel lock-up occurring even at large steering angles.

A further object of the present invention is to make it possible to change the driving rotation direction and the amount of rotation of front and rear wheels and inner and outer wheels in dependence upon the steering angle.

In order to attain the foregoing objects, the present invention provides a steering mechanism for transmitting the steering angle of a steering wheel to a wheel via a link mechanism, characterized in that the link mechanism and the wheel are coupled by a multiplying gear. The steering mechanism is further characterized in that drive means is mounted independently on each wheel, and each wheel is driven independently to enable front-wheel independent drive, rear-wheel independent drive and four-wheel independent drive. The steering mechanism is still further characterized in that the drive of an inner rear wheel may be changed through a steering angle in the vicinity of 90° to effect control of steering.

Since the link mechanism and wheel are coupled by the multiplying gear, a steering angle multiplied two-fold or more can be obtained in simple fashion via the multiplying gear even a steering angle of about 45° using the conventional link mechanism. In addition, since each wheel is driven independently, smooth drive conforming to the steering angle is possible. In the drive of each wheel, the driving conditions of the inner rear wheel may be changed over a a steering angle in the vicinity of 90°. Since drive of the inner rear wheel is halted in the vicinity of the 90° steering angle, locking of the inner front wheel can be avoided. Furthermore, since only the inner rear wheel is driven with reverse rotation when a large steering angle is obtained, smooth vehicle travel is possible even at such large steering angles.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENT

An embodiment of the present invention will now be described with reference to the drawings.

Figure 5:
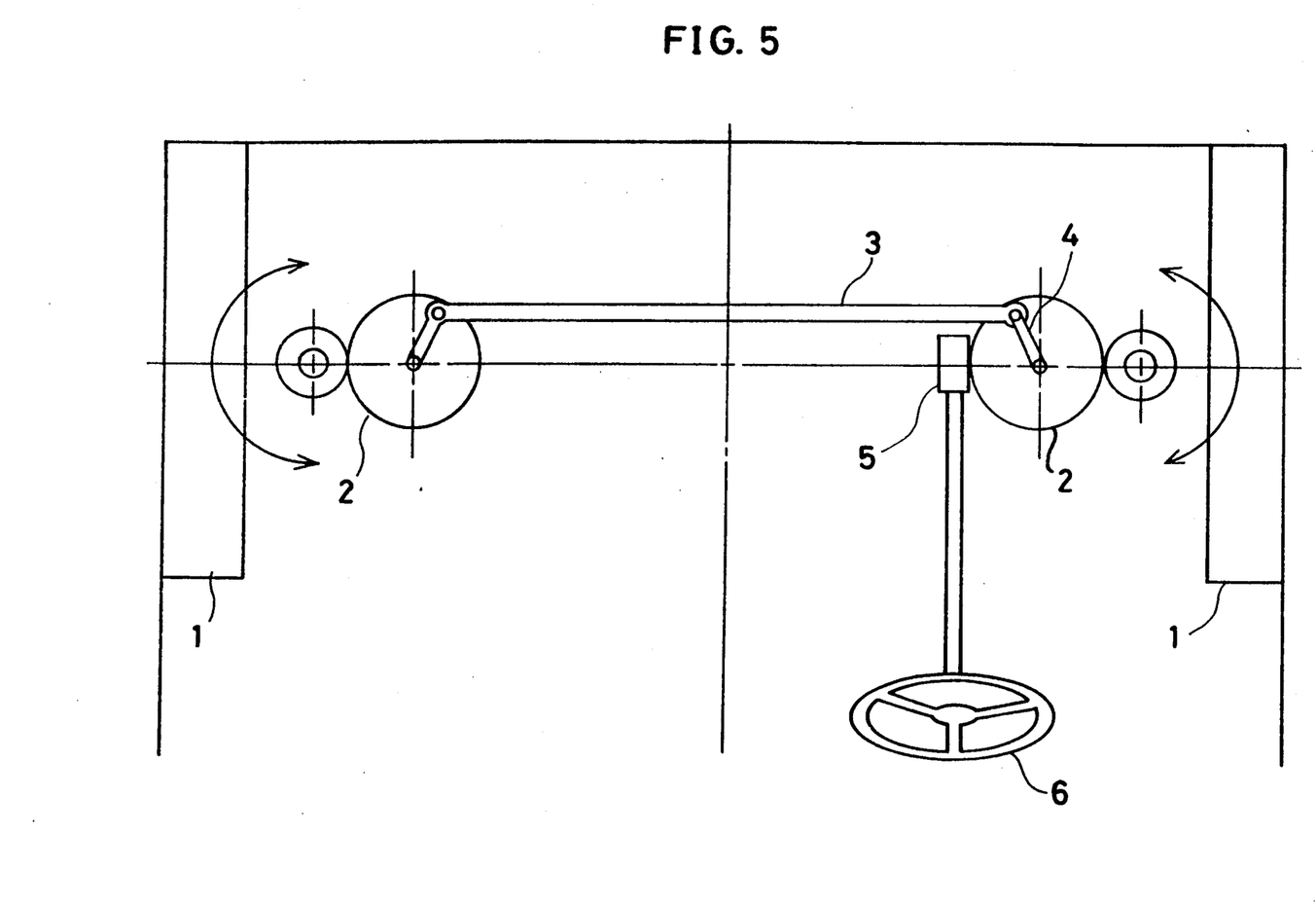
FIG. 5 is a view illustrating an embodiment of a steering mechanism according to the present invention.

With reference to FIG. 5, there are shown wheels 1, multiplying gears 2, a tie rod 3, a knuckle arm 4, a worm gear 5 and a steering wheel 6. Each multiplying gear 2 is capable of multiplying by factors of 2 to 2.5. A link mechanism comprising the tie rod 3 and knuckle arm 4 has an arrangement similar to that employed in the conventional steering mechanism. The steering motion of the steering wheel 6 is transmitted to the multiplying gear 2 by the worm gear 5. Accordingly, though the link mechanism comprising the tie rod 3 and knuckle arm 4 is capable of obtaining a steering angle of only about 45° as in the prior art, this is multiplied at least twofold by the multiplying gear 2 to make possible steering through 90°. Steering up to 112° is made possible by multiplication by a factor of 2.5. In other words, the steering angle range can be freely selected by using the multiplying gear 2 and setting the multiplying ratio thereof.

Figure 6:
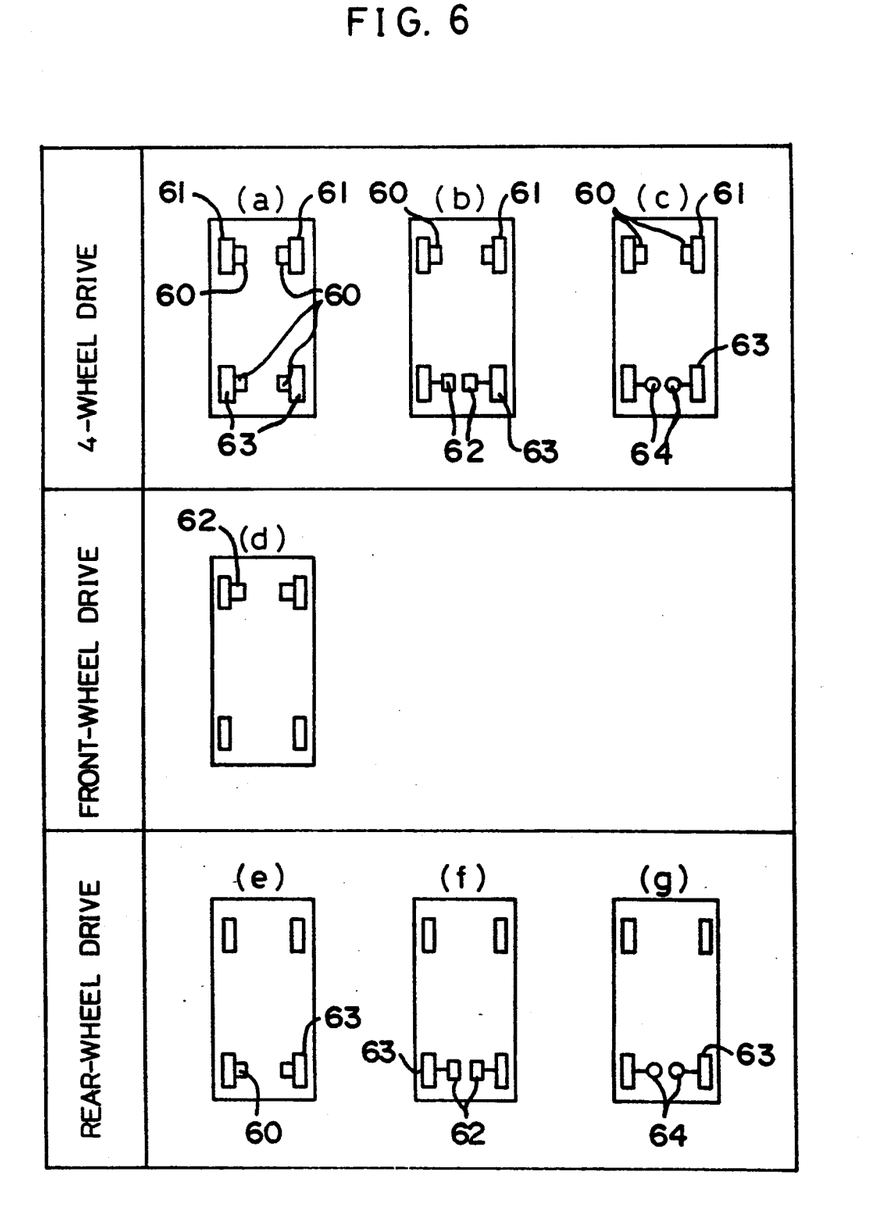
FIG. 6 is a view showing examples of arrangements of vehicles to which the steering mechanism of FIG. 5 is applied.

In a case where it is arranged to obtain any desired large steering angle by the above-described steering mechanism, the aforementioned problem regarding smooth traveling arises. Therefore, in accordance with the invention, the vehicle is designed so that all of its wheels can be driven independently, as shown in FIG. 6, thereby enabling smooth travel even at large steering angles. In FIG. 6, (a) through (c) show all-(four-)wheel drive vehicles, in which (a) is an arrangement wherein the front and rear wheels are driven by wheel motors 60(b) is an arrangement wherein the front wheels 63 are driven by wheel motors 60 and the rear wheels 63 are driven by motor coupling 62, and (c) is an arrangement wherein the rear wheels are driven by engine coupling 64 instead of motor coupling 62. FIG. 6(d) shows a front-wheel drive vehicle using wheel motors 60. FIGS. 6(e) through (g) show rear-wheel drive vehicles, in which (e) is an arrangement wherein the rear wheels 63 are driven by wheel motors 60, (f) an arrangement wherein the rear wheels 63 are driven by motor coupling 62, and (g) an arrangement wherein the rear wheels 63 are driven by engine coupling instead of motor coupling 64. In practice, the steering of wheels driven by motor coupling or engine coupling results in a large number of difficult problems related to structure, such as the large size and complexity of the steering mechanism. In this respect, since wheel motor drive enables a compact structure to be realized, this is preferred in a case where the front wheels are driven by front-wheel steering, as shown at (a) through (d) in FIG. 6. As for the rear wheels, to which a steering mechanism is not attached, any of the drive systems can be employed.

Described next will be steering control in which the steering mechanism shown in FIG. 5 is installed and the drive system shown in FIG. 6 is adopted.

Figure 7:
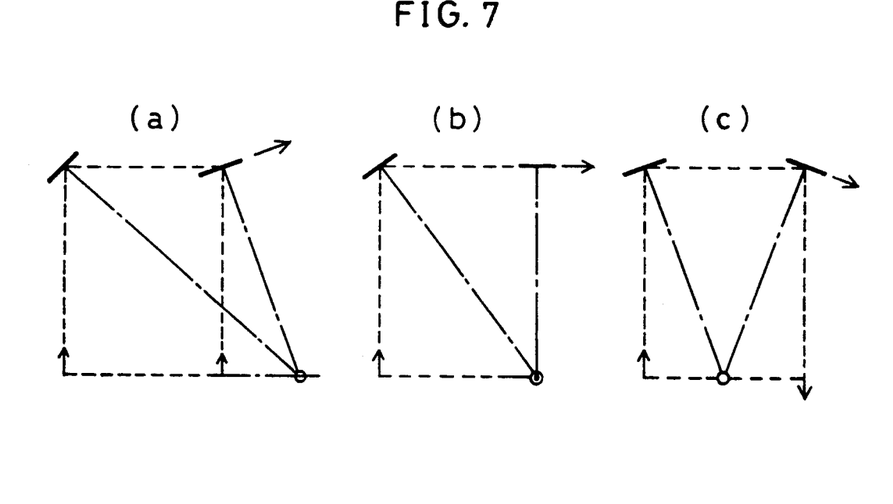
FIG. 7 is a view describing a method of controlling a vehicle to which the steering mechanism of the present invention is applied.

The center of a turn is formed on an extension of the axis of the rear wheel axle, as mentioned earlier. Therefore, the relationship between the steering angle and the center of the turn is such that the center of the turn falls on the extended axis of the rear wheel axle, as shown in FIG. 7(a), when the angle of the inner front wheel is smaller than 90°. When the angle of the inner front wheel becomes exactly 90°, the center of the turn is situated at the position of inner rear wheel, as shown in FIG. 7(b). When the angle of the inner front wheel exceeds 90°, the center of the turn is situated midway between the left and right rear wheels on the rear wheel axle, as shown in FIG. 7(c). Therefore, in controlling drive of the rear wheels especially at larger steering angles, drive is distributed or changed over accordingly to enable the vehicle to negotiate the turn smoothly.

For example, in the case of FIG. 7(a), the difference in turning radius between the inner wheel and outer wheel increases as the steering angle grows in size. Accordingly, if drive is distributed so as to absorb this difference in the turning radii, a smoother turn can be made. More specifically, if the ratio of the peripheral speed of the inner wheel to that of the outer wheel is 1:2, torque distribution corresponding to this peripheral speed ratio is performed.

It goes without saying that under traveling conditions where tight-corner braking and skidding do not pose a problem, the aforementioned torque distribution is not required and drive can be controlled as in ordinary vehicle travel. When the steering angle becomes as shown in FIG. 7(b), the drive for the inner rear wheel is locked; hence, the inner wheel is stopped and only the outer wheel is driven. When the steering angle increases further and assumes the state shown in FIG. 7(c), the center of the turn moves to the point midway between the left and right rear wheels; hence, the inner rear wheel is driven in reverse following this movement. By thus changing the direction of rotation of the inner rear wheel it is possible for the vehicle to travel smoothly even at a steering of about 90°.

The control system will now be described with reference to FIGS. 8 and 9.

Figure 8:
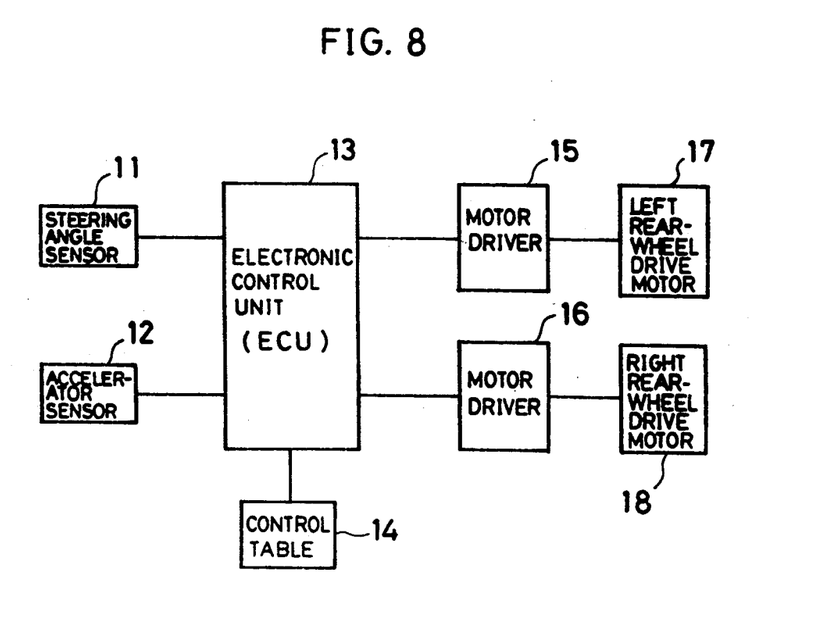
FIG. 8 is a block diagram illustrating an example of the construction of a control system according to the invention.

With reference to FIG. 8, there are shown a steering angle sensor 11, an accelerator opening sensor 12, an electronic control unit (ECU) 13, a control table 14, motor drivers 15, 16, a left rear-wheel drive motor 17, and a right rear-wheel drive motor 18. The ECU 13 reads in the steering angle from the steering angle sensor 11, reads in the amount of accelerator pedal depression from the accelerator opening sensor 11, decides control patterns for the left and right rear wheels by referring to the control table 14, and controls the motor drivers 15, 16 in conformity with the amount of accelerator pedal depression. Accordingly, control patterns for the left and right rear wheels, torque distribution values and the like are stored in the control table 14 in correspondence with the states shown in FIGS. 7(a) through 7(c). FIG. 9 illustrates an example of the flow of processing executed by the ECU 13.

Figure 9:
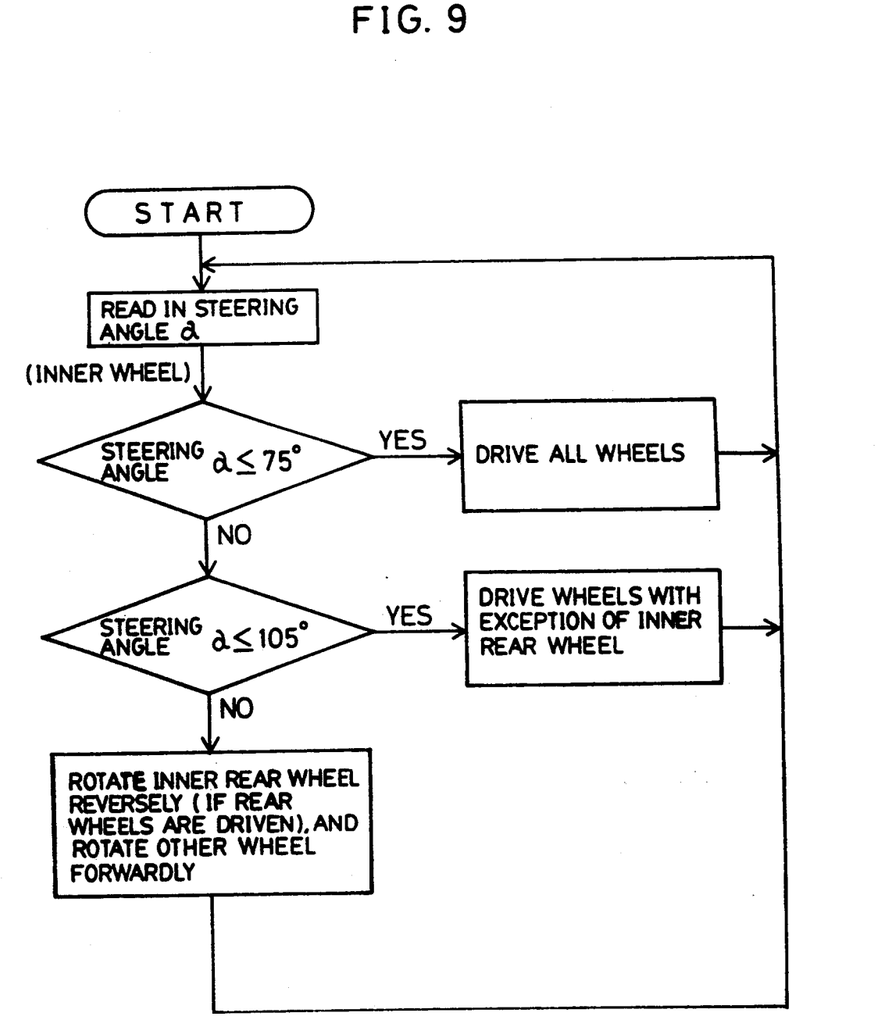
FIG. 9 is a flowchart describing the flow of processing in steering control.

In the processing shown in FIG. 9, first the steering angle α is read in and the range thereof is recognized. All wheels are driven if α is less than 75°, wheels other than the inner rear wheel are driven if α is is greater than 75° and less than 105°, and the inner rear wheel (where this is a driven wheel) is rotated in reverse while the other wheels are rotated forwardly if α is greater than 105°. This processing is executed in repeated fashion.

Figure 10:
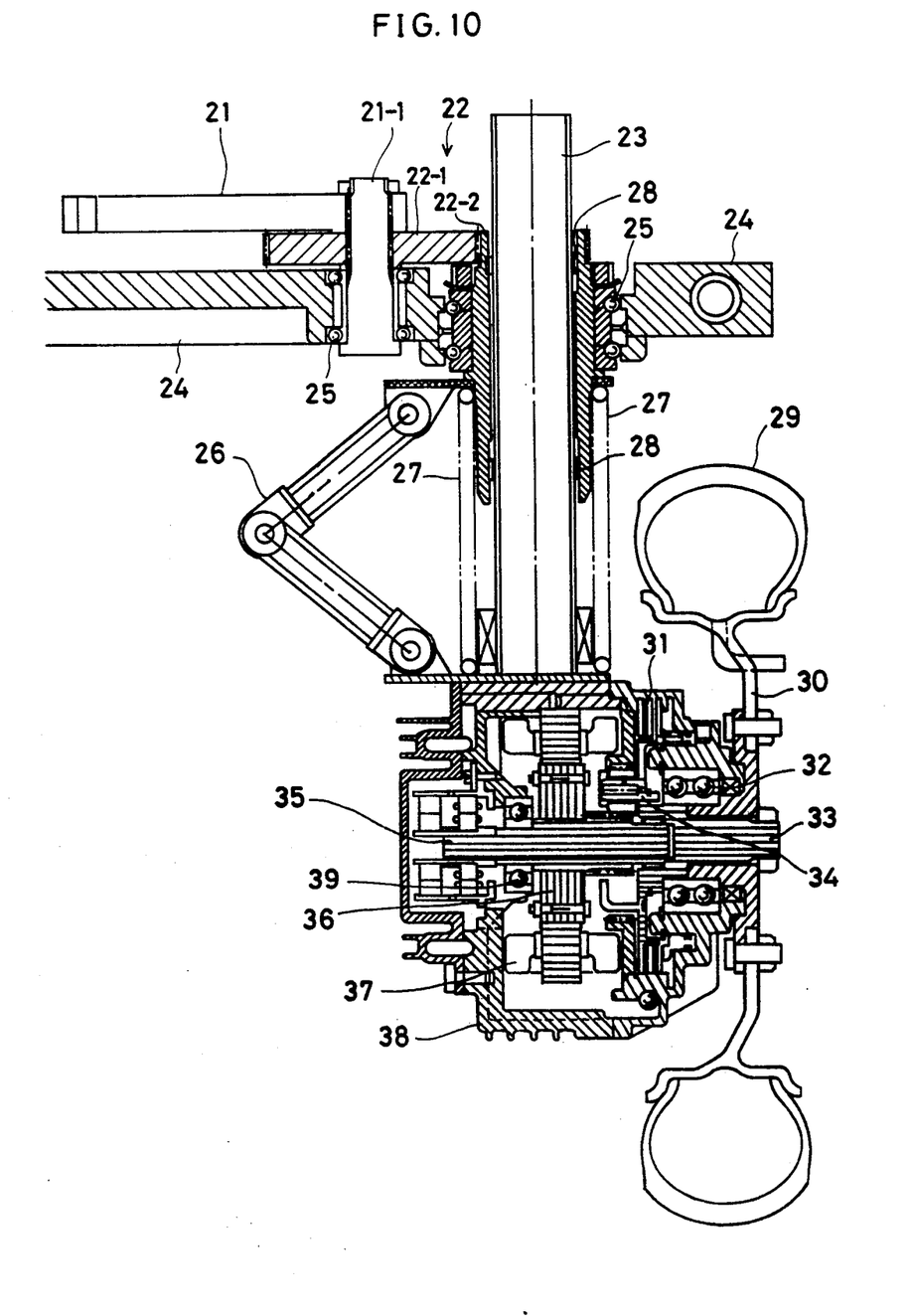
FIG. 10 is a view illustrating an example of an arrangement in which a wheel motor drive wheel is mounted on the steering mechanism of the present invention.

FIG. 10 is a view illustrating an example of an arrangement in which a wheel motor drive wheel is attached to the steering mechanism of the present invention. Shown are a knuckle arm 21, a multiplying gear 22, a steering shaft 23, a stationary frame (suspension arm) 24, a ball bearing 25, a connecting link 26, a spring 27, a metal bearing 28, a tire 29, a wheel 30, a brake 31, an output shaft support bearing 32, an output shaft 33, a planetary reduction gear 34, a rotary shaft 35, a rotor 36, a stator 37, a motor case 38, and a rotary shaft support bearing 39.

In FIG. 10, the multiplying gear 22 has a primary side 22-1 which meshes with a worm gear, as shown in FIG. 5, and is secured to a shaft 21-1 of the knuckle arm 21 to rotate in unison therewith. The shaft 21-1 is freely rotatably supported on the stationary frame (suspension arm) 24 by the ball bearing 25. The multiplying gear 22 has a secondary side 22-2 is also freely rotatably supported on the stationary frame (suspension arm) 24 by the ball bearing 25. The steering shaft 23 is passed through the secondary side 22-2 and is supported by the metal bearing 28. The lower end of the steering shaft 23 is secured to the motor case 38, the motor case 38 and the secondary side 22-2 of the multiplying gear 22 are connected by the connecting link 26, and the spring 27 is arranged in parallel with the connecting link 26. As a result, the stationary frame (suspension arm) 24 and the motor case 38 are free to oscillate relative to each other by virtue of the spring 27 and are capable of rotating in unison by virtue of the connecting link 26.

The stator 37, rotor 36, planetary reduction gear 34 and brake 31, which is composed of multiple-disk friction elements, are arranged within the motor case 38. One end of the rotary shaft 35 of the motor is fitted into one end of the output shaft 33 so that both shafts are coaxially supported, and power from the rotary shaft 35 is transmitted to the output shaft 33 via the planetary reduction gear 34. Thus, a compact wheel motor is realized by the structure in which the rotary shaft 35 is supported by the rotary shaft support bearing 39 and output shaft 33, the reduction mechanism which employs the planetary reduction gear 34, and the mechanism in which the brake 31 is connected to the carrier of the planetary reduction gear 34. The arrangement is such that the wheel 30 is rotatively driven by the output shaft 33.

The invention is not limited to the foregoing embodiment but can be modified in various ways. For example, though the multiplying gear and worm gear are connected in the foregoing embodiment, it is permissible to adopt an arrangement in which a tie rod is moved left and right directly by a rack-and-pinion or worm-type configuration, as in the prior-art mechanism shown in FIG. 2 or 3.

Figure 11:
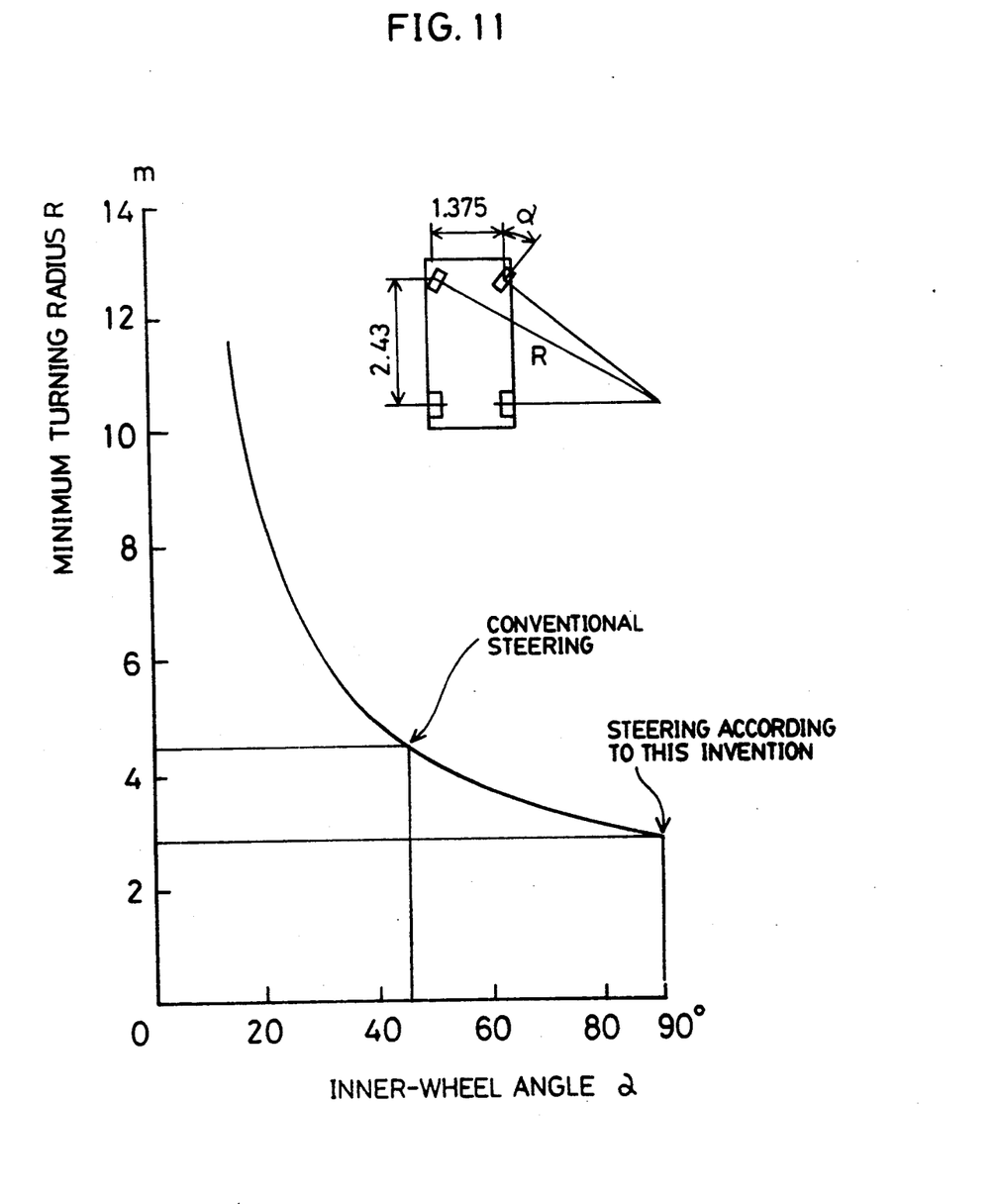
FIG. 11 is a view for describing the relationship between turning radius and the angle of an inner wheel.

FIG. 11 is a view for describing the relationship between turning radius and an inner-wheel angle. Here the minimum turning radius was obtained geometrically for a vehicle having a wheel base of 2.43 m and a tread of 1.375 m. With steering using the conventional uniform-speed joint, the inner-wheel angle was limited to 45° and the minimum turning radius was about 4.5 m. A large steering angle of 90° could not be obtained. By contrast, since the inner-wheel angle can be made 90° or more in accordance with the invention, as is evident from the foregoing discussion, the minimum turning radius can be made 2.8 m or less. This improves the maneuverability of the vehicle to readily enable parking in small spaces and U-turns on narrow roads. Steerability and traveling performance are also enhanced.

What we claim is:

1. A steering system for a vehicle comprising:
    a steering wheel,
    a plurality of steerable, ground-engaging wheels,
    two gear sets including a large gear and a small gear meshed together, each of said small gears being connected to a ground-engaging wheel and being interposed between the connected wheel and the meshed large gear, one of said large gears being connected to the steering wheel,
    a tie rod, and
    a link mechanism having two knuckle arms, each of said knuckle arms having a first end fixed to the center of a large gear and a second end rotatably connected to one end of the tie rod,
    said large gears having centers aligned with the second ends of the respective knuckle arms along lines which cross at the front side of the vehicle.

2. The steering system of claim 1 wherein said steerable ground-engaging wheels include a pair of front wheels and a pair of rear wheels, said link mechanism being operatively connected to said front wheels.

3. The steering system of claim 2 further comprising:
    a steering angle sensor for detecting steering angle and generating a first electrical signal representative of said detected steering angle, and wherein said rear wheels are each independently driven responsive to said electrical signal.

4. The steering system of claim 3 further comprising an accelerator sensor for generating a second electrical signal representative of the amount of accelerator pedal depression and wherein said rear wheels are each independently driven responsive to said first and second electrical signals.

5. The steering system of claim 1 further comprising:
    two wheel motors, each of said wheel motors independently driving one of said rear wheels.

6. The steering system of claim 1 further comprising a steering shaft on which said steering wheel is mounted and a worm gear on one end of said steering shaft, said worm gear being meshed with said one large gear.

* * * * *